(12) United States Patent
Tamm (10) Patent No.: US 6,918,823 B2
(45) Date of Patent: Jul. 19, 2005

(54) DOUBLE GRINDING WHEEL

(76) Inventor: Rolf Tamm, Am Fohrenbühl 8, 88682 Salem (DE)

( * ) Notice: Subject to any disclaimer, the term of this patent is extended or adjusted under 35 U.S.C. 154(b) by 0 days.

(21) Appl. No.: 10/654,700

(22) Filed: Sep. 4, 2003

(65) Prior Publication Data

US 2004/0127149 A1 Jul. 1, 2004

(30) Foreign Application Priority Data

Sep. 17, 2002 (DE) .......................................... 102 43 210

(51) Int. Cl.[7] .............................................. B24B 19/00
(52) U.S. Cl. .......................... 451/65; 451/241; 451/282
(58) Field of Search ................................ 451/241, 282, 451/349, 358, 359, 545, 56, 45, 48, 189, 234, 386, 394, 549; 409/131, 132, 140, 181

(56) References Cited

U.S. PATENT DOCUMENTS

| | | | | |
|---|---|---|---|---|
| 3,841,030 A | * | 10/1974 | Laszlo ......................... | 451/358 |
| 4,069,619 A | * | 1/1978 | Escamilla ..................... | 451/65 |
| 4,610,153 A | * | 9/1986 | Nedorezov .................... | 72/112 |
| 4,842,456 A | * | 6/1989 | Saito .......................... | 409/145 |
| 4,856,949 A | * | 8/1989 | Shimada ...................... | 409/140 |
| 5,288,185 A | * | 2/1994 | Mattsson ..................... | 409/131 |
| 6,106,372 A | * | 8/2000 | Clark .......................... | 451/56 |
| 6,162,115 A | * | 12/2000 | Schudrich .................... | 451/57 |
| 6,195,860 B1 | | 3/2001 | DiRosa et al. | |

FOREIGN PATENT DOCUMENTS

| | | |
|---|---|---|
| DE | 41 07 462 C 2 | 5/1997 |
| DE | 100 10 520 A 1 | 9/2001 |
| DE | 699 02 339 T 2 | 3/2003 |

* cited by examiner

*Primary Examiner*—Lee D. Wilson
*Assistant Examiner*—Anthony Ojini
(74) *Attorney, Agent, or Firm*—Lawrence G. Fridman (57) ABSTRACT

A device for processing welding electrodes includes a driving motor, a shaft, a housing and a first grinding wheel rotatably mounted on the shaft. The first grinding wheel is driven by the driving motor through the shaft. The lateral openings formed in the housing and are adapted to guide the welding electrode for grinding into a defined position relative to the first grinding wheel. A second grinding wheel is provided which is also driven by the shaft.

16 Claims, 10 Drawing Sheets

DOUBLE GRINDING WHEEL

TECHNICAL FIELD

The invention relates to a device for processing welding electrodes with a grinding wheel comprising a grinding wheel driven by a driving motor through a shaft running in a housing, at least one lateral opening being provided in the housing for guiding a welding electrode for processing into a defined position relative to the grinding wheel.

BACKGROUND OF THE INVENTION

Welding electrodes consist of a very hard material such as tungsten with high stability even at high temperatures. There are welding electrodes with different cross sections. The welding electrodes have a tip or an edge at its end. The form of the welding electrodes depends on their respective application. Such tips suffer from wear during operation.

Welding electrodes can be bought with pre-manufactured tips. The tip is worn after its use. The welding electrodes are then discarded. This is expensive because high-quality material is expensive.

It is known to regrind used welding electrodes. This is usually carried out manually on open grinding—or cutting-off wheels. This method is inaccurate and dangerous. Furthermore devices are known with an open grinding wheel wherein the welding electrodes are guided at a certain angle with respect to the grinding wheel by a guiding sleeve. Such devices are also expensive. It is especially expensive to adapt the device to fit with the various types of welding electrodes or with various shapes of the tips or cutting edges. This requires the exchange of the guiding sleeves.

A device for producing electrodes with a plurality (for example 6) of different electrode cross sections with a plurality of different tip angles (for example 4) and a plurality of lengths is a useful and cost-saving means.

From the DE 100 10 520 A1 a device for processing welding electrodes with a grinding wheel is known. The grinding wheel rotates within a grinding wheel housing. The device also has a housing cap fixed to the grinding wheel housing and having at least one lateral opening for guiding a welding electrode for processing into a defined position relative to the grinding wheel. The plane of the grinding wheel is essentially the separating plane between the grinding wheel housing and the cap. The cap can have a plurality of different lateral openings spaced apart for receiving different types of welding electrodes. The cap can also have a plurality of lateral openings spaced apart with axes crossing the plane of the grinding wheel at different angles. A radial slit can be formed in the grinding wheel housing extending over the front surface of the housing. A welding electrode can be guided through the slit for cutting at the lateral surface of the grinding wheel. In the disclosed device the grinding wheel is fixed to a grinding wheel seat which is connected to the shaft of the driving motor. The entire device is a portable unit.

The device known from the prior art allows the grinding of thick electrodes as well as thin electrodes. It is, however, a disadvantage that the grinding wheel which is required to achieve a fine grinding result has only a small grinding rate. This is particularity disadvantageous with thick electrodes. Therefore, each time, when a high grinding rate is necessary the fine grinding wheel has to be replaced by a rougher grinding wheel. This is time consuming.

DISCLOSURE OF THE INVENTION

It is an object of the invention to provide a device of the above mentioned kind which provides a fine grinding as well as a high grinding rate. Furthermore, it is an object of the invention to increase the number of possible lateral openings.

According to the invention this object is achieved in that a further grinding wheel is provided which is driven by the shaft. In this case grinding wheels with different graining can be used. The use of two or more grinding wheels with different graining enables a fine grinding, for example at the first fine grinding wheel and a high grinding rate, for example at the second rough grinding wheel. Both grinding wheels are driven by the same shaft so that no further motor or other expensive devices are necessary. An alteration of the device is no longer necessary.

Also, the use of two or more grinding wheels increases the available grinding surface. Thereby more lateral openings can be provided in the grinding wheel housing for different widths and different grinding angles.

Due to the welding arc an electrode with very precisely defined tip angles have to be used for the welding process. The tip angles of for example 15, 18 22.5 and 30 degrees are very important for the exact generation of an arc at different currents. This applies even more for automatic arc welding (Orbital). Therefore the tip angle has to be produced with very small tolerance. Contrary to the processing of electrodes the generation of a lateral opening in the housing for guiding the electrode is possible in a very simple way with high tolerance. The processing of the material for the electrodes, tungsten, however, is very difficult. This is only facilitated by the guiding of the housing. The grinding angles have a high accuracy. No adjustment of the device or a checking of the results is necessary.

The further grinding wheels can rotate in one or more further housings. The further housing can be attached to the first housing in alignment with the first housing. Further housings can then be additionally mounted depending on the number of grinding wheels to be used.

Preferably means for centering the shaft in the grinding wheels are provided. This can be, for example, an extension of the shaft. Thereby good concentric running is achieved.

Preferably the first housing is formed of two parts the first part receiving the housing of the grinding wheel and its bearing and the second being exchangeably fixed to the first part having the lateral opening. The first part of the housing of the second grinding wheel receiving the grinding wheel can be formed by the second part of the housing of the first grinding wheel and the second part which is provided with the lateral opening to the second grinding wheel can be identical with the first part of the housing. This means that the first part of the housing of the first grinding wheel connected with the motor can be a motor flange. All further housing parts are stacked thereon. The housing parts being of identical shape results in low production costs. Furthermore it provides the option to enlarge the device by as many grinding wheels as desired. Also existing devices with only one grinding wheel can be extended by a further housing.

Preferably the planes of the grinding wheels are essentially the separating planes between the grinding wheel housing and the cap. The lateral openings for inserting the electrodes in the direction of the grinding wheel are positioned on the side along the circumference of the stacked housing parts.

In a particularly preferred embodiment of the invention, the housings have a plurality of different mutually shifted lateral openings for receiving different types of welding electrodes, in particular for receiving of different diameters of welding electrodes. Furthermore each housing can be provided with a plurality of different mutually offset lateral openings which have axes intersecting the plane of the grinding wheel at different angles. In this case for each grinding angle different lateral openings with different diameters can be provided and grouped and labeled accordingly. Depending on the used electrode, the desired grinding angle and the finess of the grinding a suitable lateral opening is chosen at a suitable grinding wheel, the electrode is inserted and ground.

Preferably the grinding wheels are form fitting connected with a grinding wheel receiving unit which is connected to the shaft of a driving motor. Several grinding wheel receiving units which are connected with each other can be provided also.

In order to provide the form fitting, a central clamping screw is provided for clamping the grinding wheel in the grinding wheel receiving unit and an off-center pin is provided as a centering means the pin engaging in a hole in the grinding wheel. Preferably a longitudinal bore hole is provided at the front surface of the housing for providing access for a tool to the clamping screw. Furthermore there are means provided for fixing the grinding wheel receiving unit against rotation.

In a particularly preferred embodiment of the invention a longitudinal slit is formed in each housing extending along the front surface of the housing. A welding electrode can be passed through such a slit for cutting at the circumferential edge of the grinding wheel.

Further modifications of the invention are subject matter of the subclaims. An embodiment is described below in further detail with reference to the accompanying drawings.

DESCRIPTION OF AN EMBODIMENT

Figure 1:
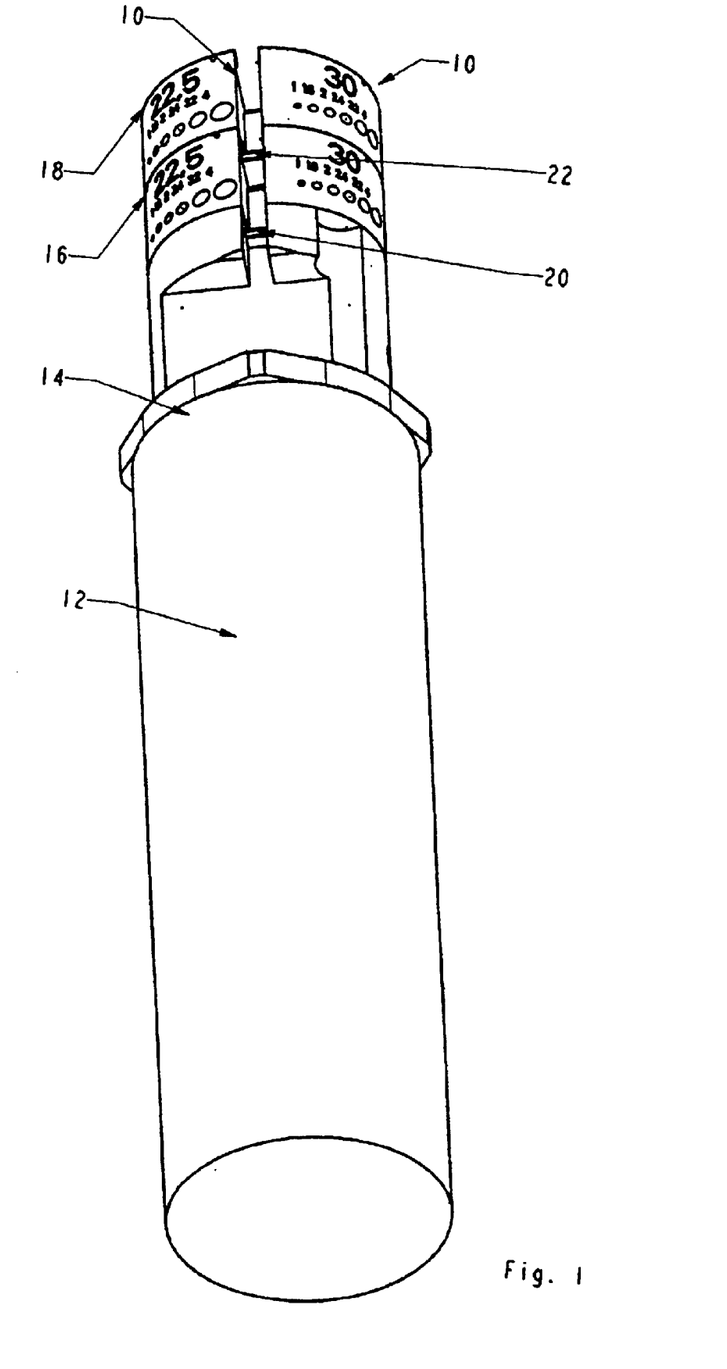
FIG. 1 shows an assembled grinding device with two housing parts for grinding welding electrodes

In FIG. 1, numeral 10 generally denotes a device for grinding welding electrodes. The device 10 comprises a motor in a motor housing 12, a motor flange 14 screwed to the motor housing 12 and two cylindric housing parts 16 and 18 arranged on the motor flange 14. The housing parts 16 and 18 are identical. The housing parts 16 and 18 are connected to the motor and the motor flange in a way which is described in greater detail below. A first grinding wheel 20 rotates in the plane between the motor flange 14 and the housing part 16. A second grinding wheel 22 with a different grain size rotates in the plane between the housing parts 16 and 18.

Figure 2:
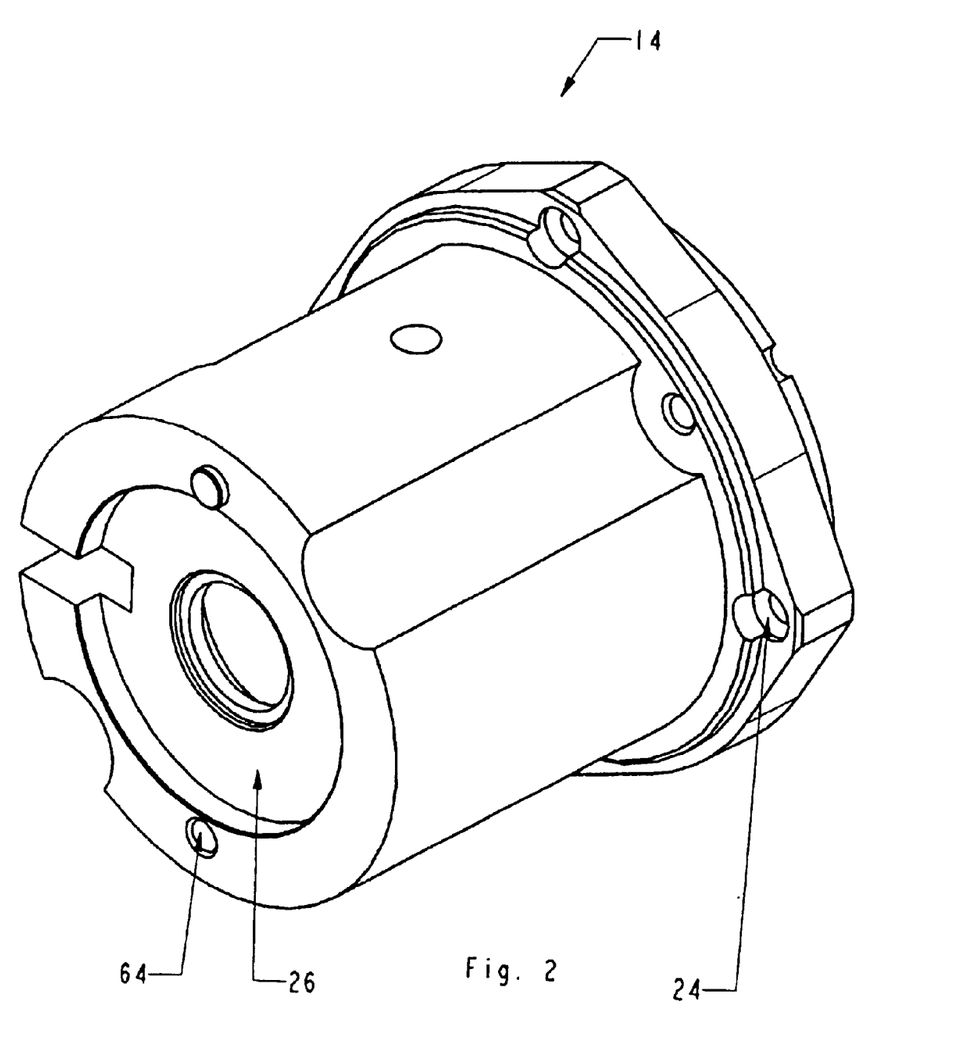
FIG. 2 is a separate, perspective view of a motor flange.
Figure 3:
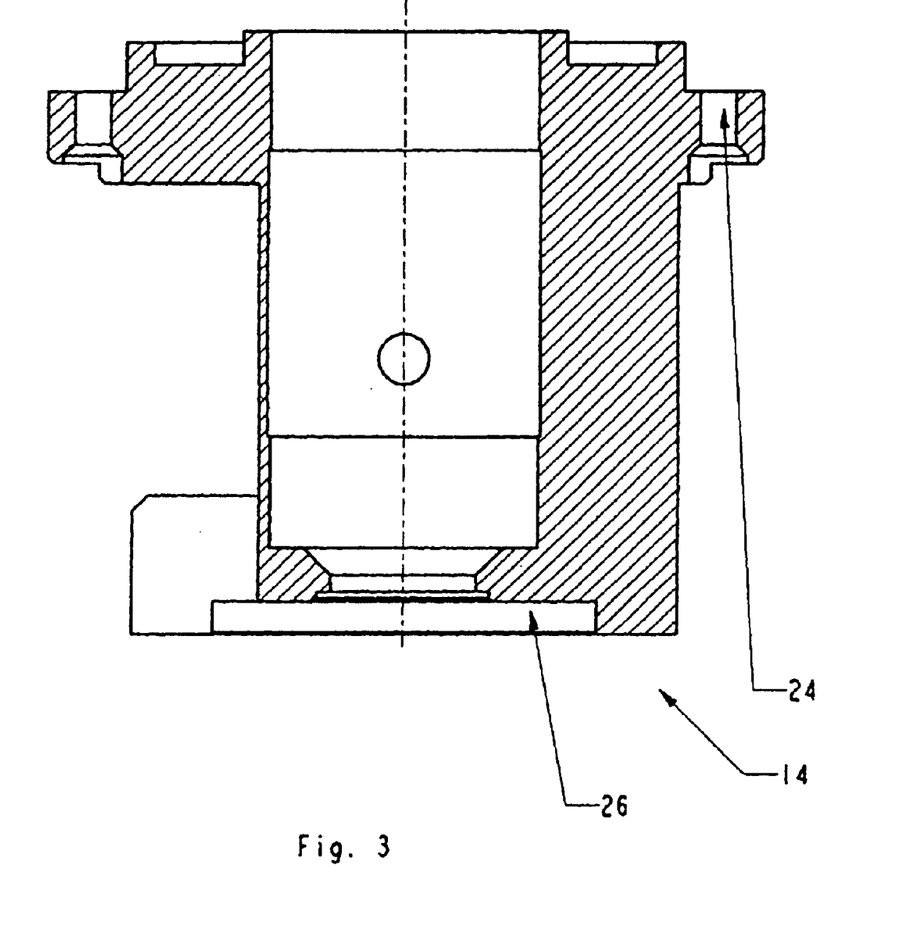
FIG. 3 is a cross sectional view of the motor flange of FIG. 2.
Figure 4:
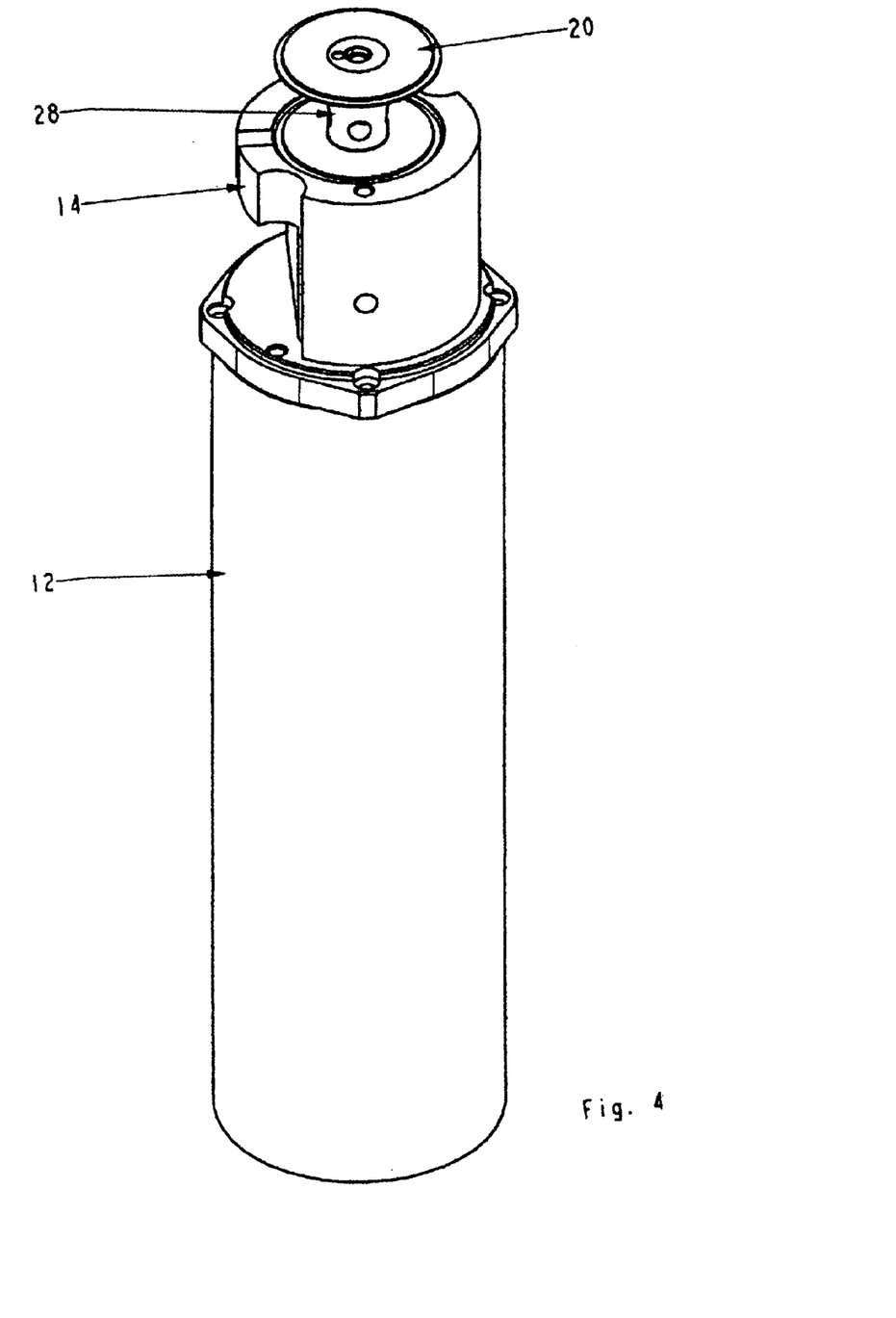
FIG. 4 is an exploded view of the motor with a motor flange and a first grinding wheel
Figure 5:
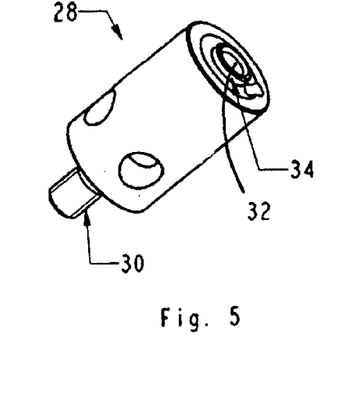
FIG. 5 is a separate perspective view of a connecting shaft

In FIG. 2 and FIG. 3 the motor flange 14 is separately shown. The flange is provided with bore holes 24. The flange is screwed to the motor through these bore holes 24 as shown in FIG. 1. A plate like depression 26 is provided on the end of the motor flange 14 which is remote to the motor. This depression serves as a receiving unit for a first grinding wheel 20. This is shown in the exploded view of FIG. 4. A connecting shaft 28 which is required for the screwed connection of the grinding wheel 20 with the motor 12 is separately shown in FIG. 5. The connection shaft 28 has an externally threaded pin 30.

Figure 6:
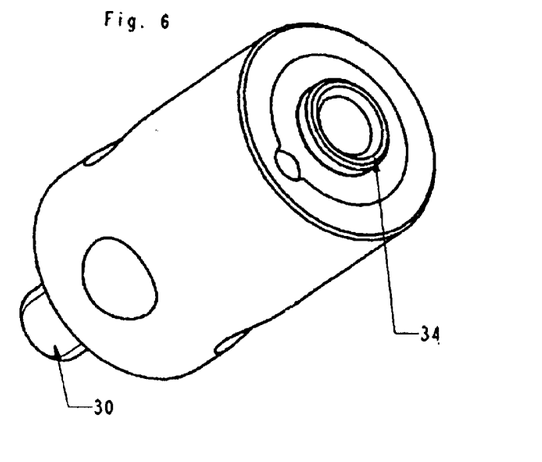
FIG. 6 shows a different view of the shaft of FIG. 5
Figure 7:
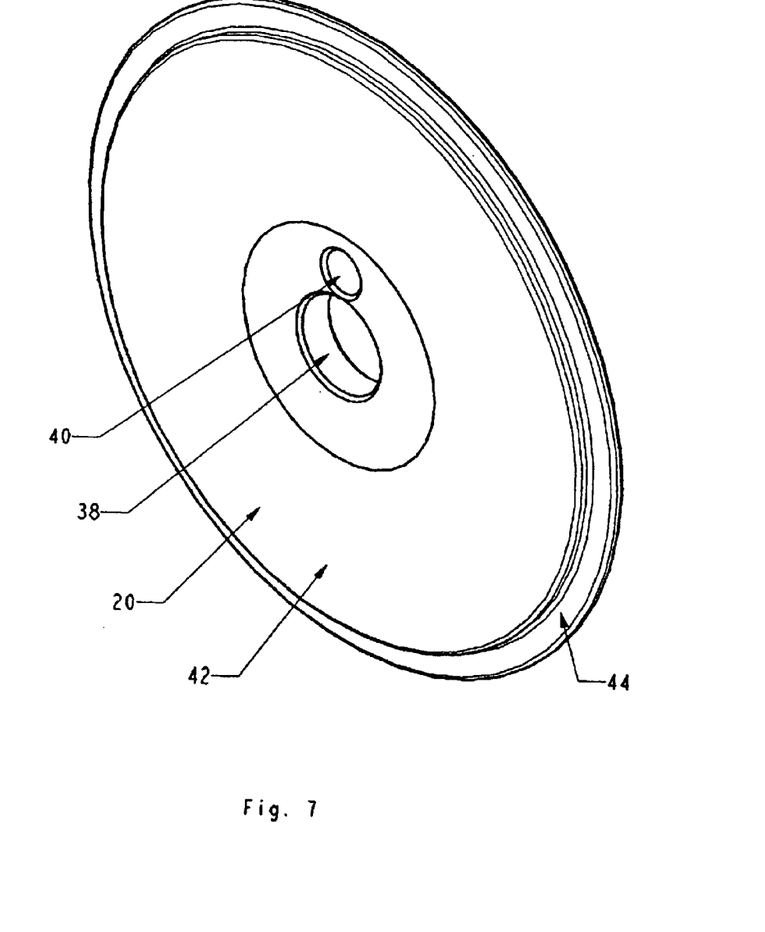
FIG. 7 shows a grinding wheel

With this pin 30 the connection shaft is screwed on the motor shaft (not shown). Furthermore the shaft 28 has an internally threaded bore hole 32. The bore 32 is provided with a collar 34 projecting outwardly in an axial direction. This can be seen in FIG. 6 in greater detail. A grinding wheel 20, as separately shown in FIG. 7, is arranged on the collar 34.

The grinding wheel 20 is provided with a central bore hole 38 and an off-axis bore hole 40. The central bore hole 38 is positioned and centered on the collar 34 of the connection shaft 28. The rotational axis coincides with the axis of the bore hole 38, a pin (not shown) engaging in the bore hole 40 and transmitting the driving power to the grinding wheel 20. The grinding wheel 20 has a thick center portion 42 and a thinner outer portion 45. The cutting characteristics of the wheel are improved by the thinner outer portion 45. However, with the thick center portion 42 the wheel remains stable.

Figure 8:
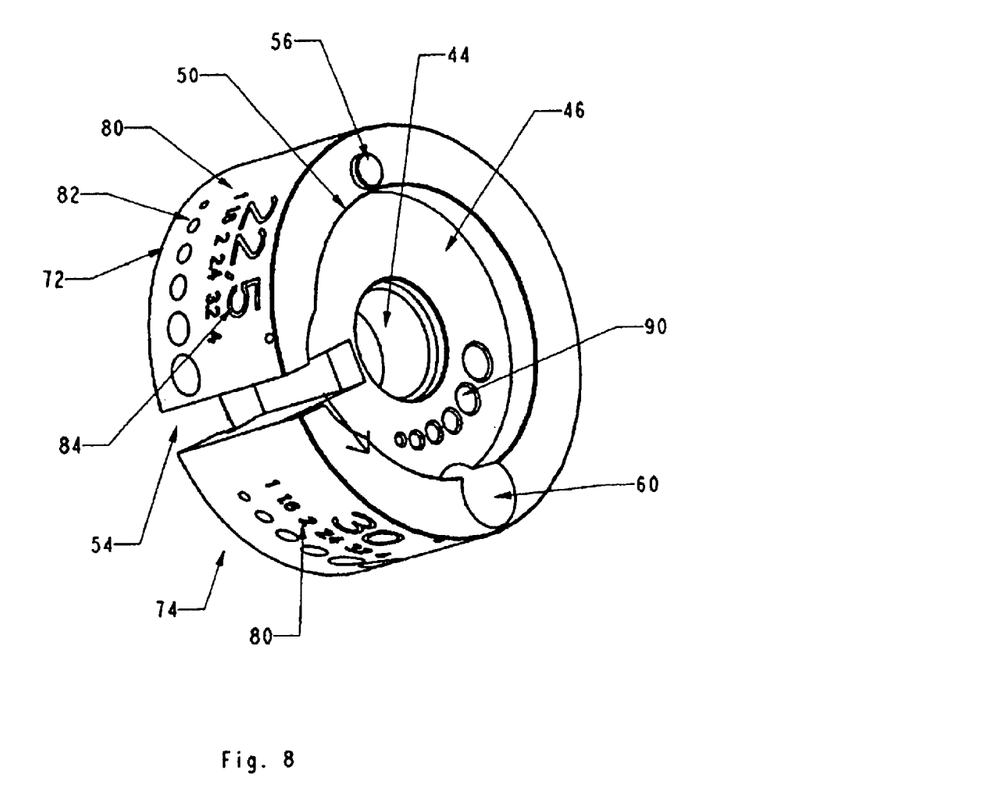
FIG. 8 shows a housing part from a first direction
Figure 9:
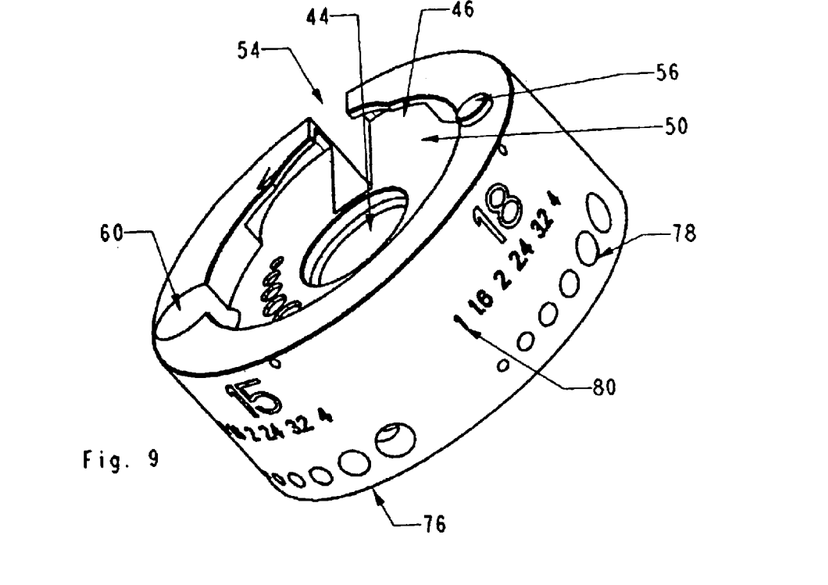
FIG. 9 shows the housing part of FIG. 8 from a different direction

If the grinding wheel 20 is set into the connection shaft 28, the essential cylindrical housing part 16 is coaxially arranged on the motor flange 14. The housing part 16 is shown in the FIGS. 8 to 10 in various views in detail. The housing part 16 has a center bore hole 44. The center bore hole 44 is aligned with the bore holes 38 of the grinding wheel 20 and 34 and the connection shaft 28. A depression 50 and 52, respectively, is provided around the bore hole at both plane surfaces 46 and 48 of the housing. The depressions 50 and 52 have about the same dimensions as the depression 26 in the motor flange 14. The depressions 26, 50 and 52 serve to receive the grinding wheels 20 and 22 when the assembly is put together. Furthermore, the housing 16 has a slit 54 in a radial direction extending along the entire width of the housing, the slit 54 is wide enough to insert electrodes. When the grinding wheel rotates the electrode can be shortened at the thin end of the grinding wheel by cutting off the worn end of the electrode. The slits of aligned housing parts 16 and 18 are positioned such that they form one long slit, as shown in FIG. 1.

Figure 10:
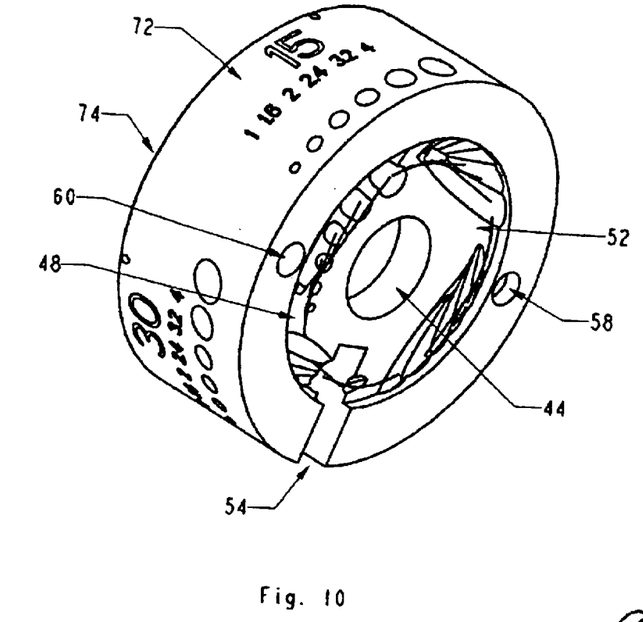
FIG. 10 shows the housing part of FIGS. 8 and 9 from a yet different direction
Figure 11:
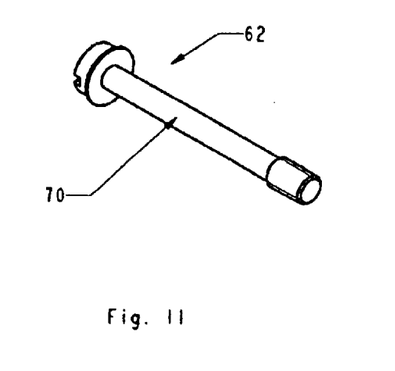
FIG. 11 shows a connecting screw for screwing two housing parts on the motor flange
Figure 12:
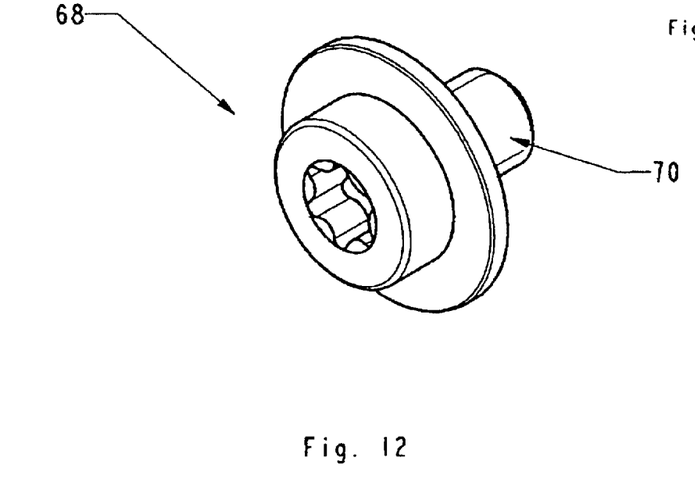
FIG. 12 shows the connecting screw for screwing one housing part on the motor flange

Furthermore, a pin 56 is provided at the side 46 of the housing 16, the pin 56 engaging a corresponding bore hole 58 on the adjacent side 48 of the identical housing 18 (FIG. 10) when the assembly is put together. The pin 56 serves for fixing the assembly in its position. Furthermore, a bore hole 60 is provided. The bore hole 60 extends over the entire width of the housing. A screw (not shown) engages through the bore hole 60 for screwing the housings together to the motor flange. Such a screw is separately shown in FIG. 11. The screw 62 extends through the coaxial bore hole 60 of the housings 16 and 18 and is screwed in a bore hole 64 provided with an internal screw thread in the motor flange 14 (FIG. 2). The motor flange also has a pin 66 on which the housing 16 can be fixed with the bore hole 58 (FIG. 10 ). With such an arrangement the housings 16 and 18 are tightly screwed to the motor flange 14 by only one screw. This enables a particularly simple and quick disassembly and assembly if a grinding wheel must be exchanged. If only one grinding wheel shall be used and accordingly only one housing part 16 shall be fixed on the motor flange 14 a screw 68 with a shorter neck 70 is used. An example for such a screw 68 is shown in FIG. 12.

The housing 16 (and the identical housing 18) has four groups 72, 74, 76 and 78 of lateral openings. These groups of lateral openings extend along the circumference down to the underside 48, respectively. Each group comprises six lateral openings 82 of different diameter which is indicated by an engraving 80 over the lateral opening. The angle under which an electrode inserted in a lateral opening 82 contacts the grinding wheel is the same within each group of lateral openings. It can be seen from the drawing, that the lateral opening 80 has a diameter of 1.6 mm and a grinding angle of 22.5 degrees. The angle for each group is indicated by a further engraving 84 above the first engraving. In the present embodiment, there are four different angles possible for grinding the electrode tips. Also, electrodes with as many as up to six different diameters can be used. The electrode is so well guided by the lateral opening 82 that reproducible results can be achieved without any expense or danger. If more grinding angles or further electrode diameters need to be considered, a further housing with the corresponding lateral openings can be mounted on the assembly.

Figure 13:
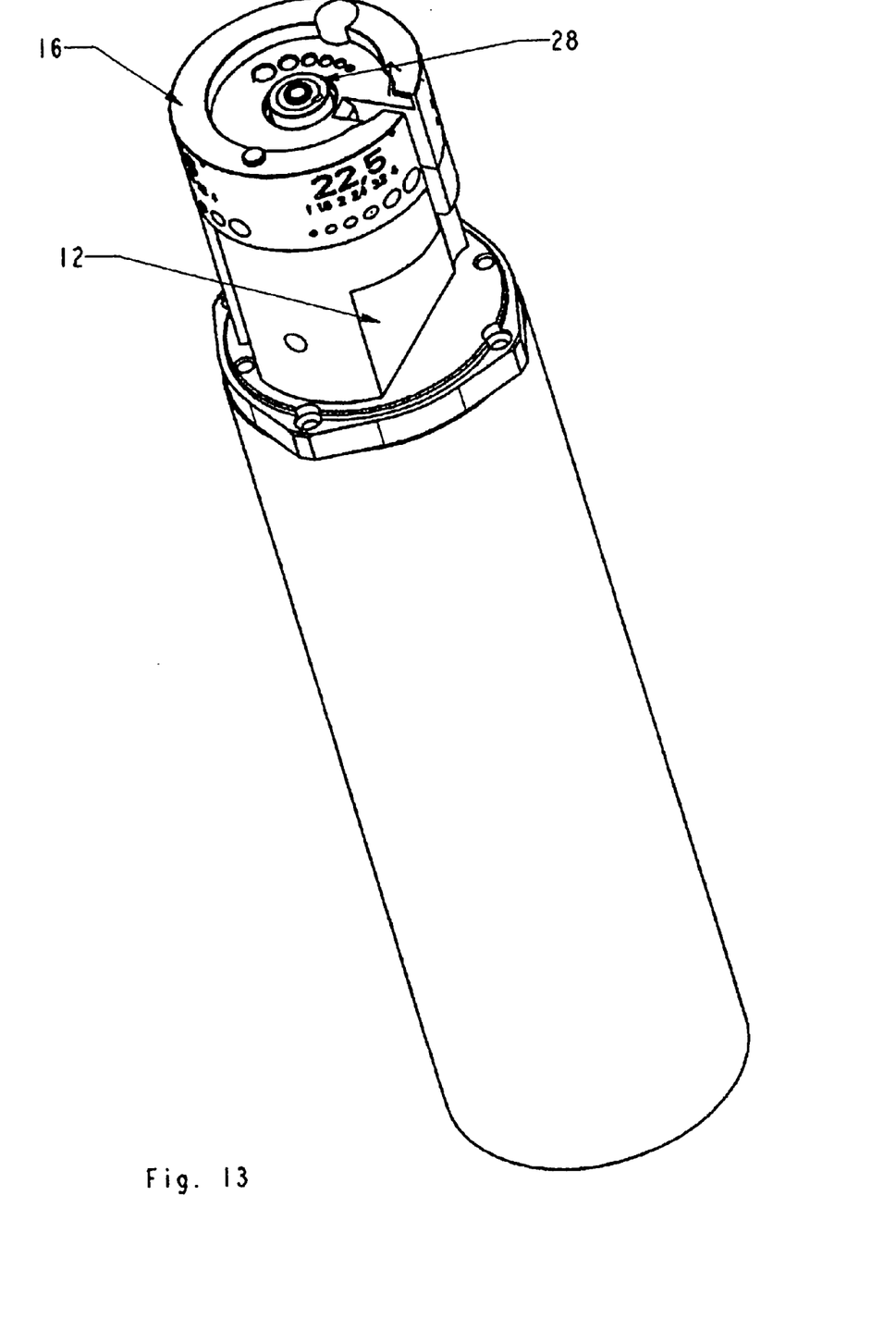
FIG. 13 shows the arrangement of FIG. 1 without the second grinding wheel and the second housing part.
Figure 14:
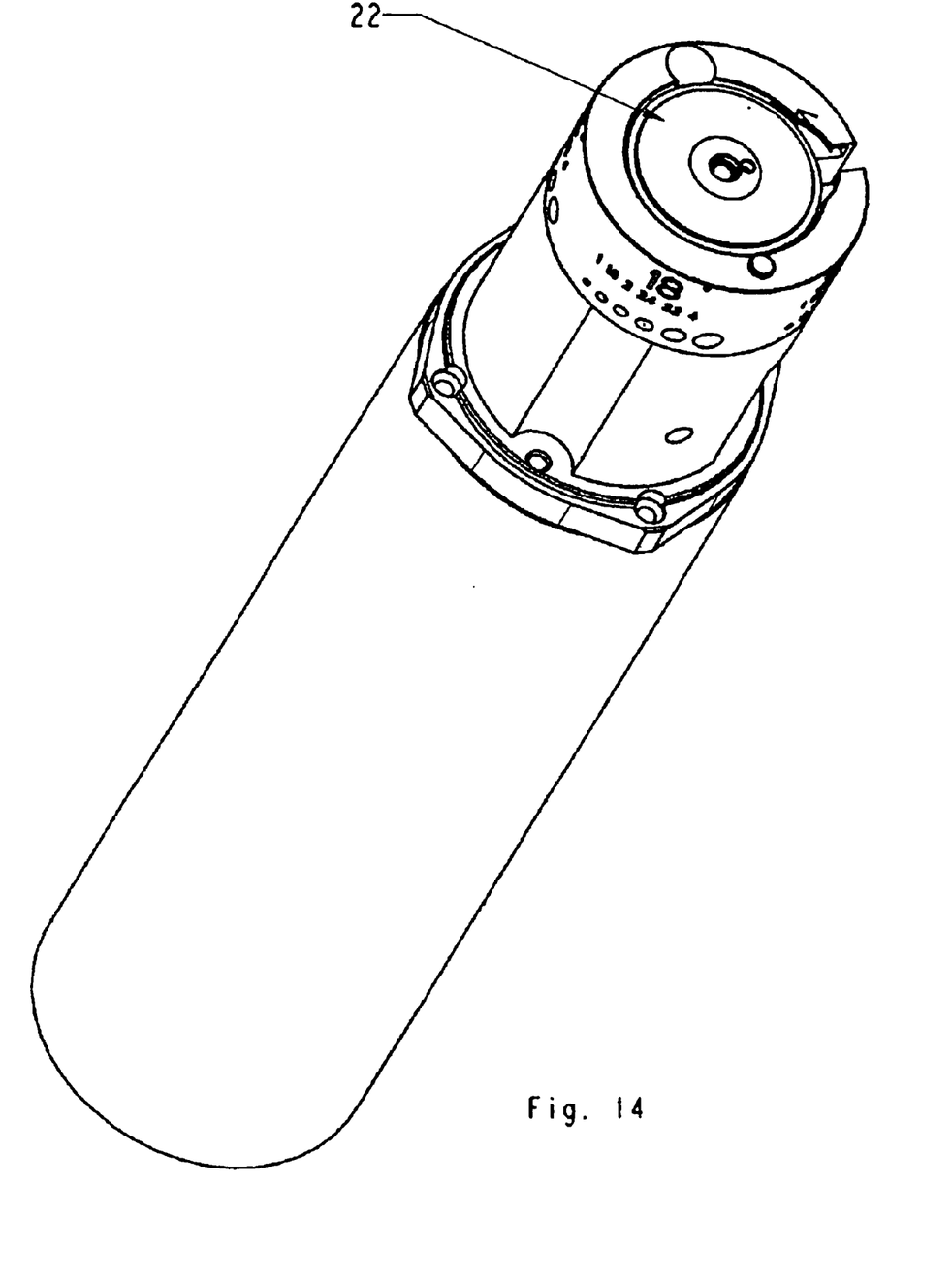
FIG. 14 shows the arrangement of FIG. 13 with the second grinding wheel.
Figure 15:
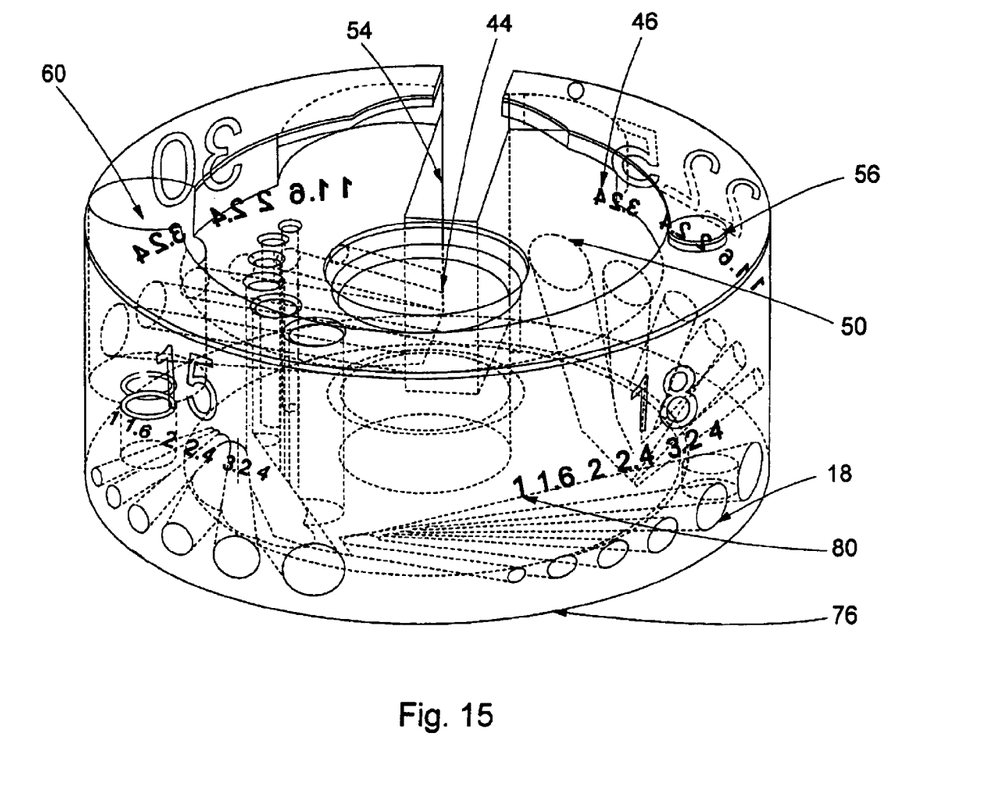
FIG. 15 shows the housings with lateral openings extending at different angles to a respective grinding wheel.

In FIG. 13 it is shown how the housing 16 is mounted on the motor flange 14 and how the connection shaft 28 is arranged in the center bore hole. In FIG. 14, a further grinding wheel 22 is inserted in the assembly of FIG. 13. A further housing part 18 is mounted on this assembly as it is shown in FIG. 1. The grinding wheel 22 has a rougher grain size than the grinding wheel 20. Thereby thicker electrodes can be ground by this grinding wheel at a high grinding rate. The fine grinding of these electrodes can afterwards be achieved at the grinding wheel 20. The grinding wheel 20 is a diamond grinding wheel. Thin electrodes may be directly ground by the fine grinding wheel 20. If necessary, further grinding wheels can be provided in further housing parts. Furthermore, the housing part 18 has a group of openings vertically extending from the side 46 to the side 48 of the housing part 18. These openings, too, have different diameters corresponding to the diameters of the previously described groups of openings. The openings of the group 90 enable the perpendicular grinding of electrode tips.

The entire assembly is screwed on a hand-held unit. The first grinding wheel is positioned directly in front of the ball bearing of the motor shaft. This prevents lurching at high angular rates.

Due to the use of modules an existing electrode grinding head can be upgraded in a very simple way by using a second housing part with a longer screw and a second grinding wheel in the demonstrated way. The assembly is not much longer than existing ones and can therefore still be used in hand-held units.

I claim:

1. A device for processing welding electrodes by means of a grinding wheel, comprising:
    a driving motor, a shaft connected to said driving motor, a first housing, a first housing, a first grinding wheel rotatably mounted on said shaft in said first housing, said first grinding wheel is driven by said driving motor through said shaft, lateral openings provided in said first housing, said lateral openings being adapted to guide a welding electrode for grinding into a defined position relative to said first grinding wheel, a second housing, a second grinding wheel being rotatably mounted on said shaft in said second housing, lateral openings being provided in said second housing and adapted to guide a welding electrode for grinding into a defined position relative to said second grinding wheel.

2. A device according to claim 1, wherein said first and second grinding wheel have different graining.

3. A device according to claim 1, wherein said plurality of lateral openings provided in said first and second housings are formed having different diameters.

4. A device according to claim 1, wherein said plurality of lateral openings provided in said first and second housings are formed having different angles with said respective grinding wheels.

5. A device according to claim 1, wherein said second housing is mounted in alignment with said first housing on said first housing.

6. A device according to claim 1, further comprising means for centering said shaft in said first and second grinding wheels.

7. A device according to claim 1, wherein said first housing comprising a first and a second part,
    said first part of said first housing is adapted to receive said first grinding wheel and said second part of said first housing is exchangeably attached to said first part of said first housing,
    said second part of said first housing is adapted to receive said second grinding wheel,
    said second housing is substantially similar in shape to the shape of said second part of said first housing, and
    said second housing being exchangeably attached to said first housing.

8. A device according to claim 1, wherein said first housing comprising a first and a second part,
    said first part of said first housing is adapted to receive said first grinding wheel and said second part of said first housing is exchangeably attached to said first part of said first housing,
    said second part of said first housing is adapted to receive said second grinding wheel,
    said second housing has outer dimensions substantially similar to outer dimensions of said second part of said first housing, and
    said second housing being exchangeably attached to said first housing.

9. A device according to claim 8, wherein said first and second grinding wheels rotate in respective grinding planes, and said first grinding wheel essentially coinciding with the separating plane between said first and second housings.

10. A device according to claim 1, wherein said plurality of the lateral openings in the first and second housings is a plurality of different mutually displaced lateral openings provided for receiving different types of welding electrodes.

11. A device according to claim 1, wherein said plurality of lateral openings in the first and second housings is a plurality of different mutually shifted lateral openings having axes intersecting planes of the respective grinding wheels at different angles.

12. A device according to claim 1, wherein said first and second grinding wheel form a fitting through a connection with grinding wheel receiving means connected to the shaft of a driving motor.

13. A device according to claim 12, wherein a central clamping screw is provided for clamping said first and second grinding wheels in the grinding wheel receiving means and an off-center pin is provided as a centering means, said pin engaging a hole in the grinding wheel.

14. A device according to claim 13, wherein a longitudinal bore hole is provided at a front surface of said first housing for providing access for a tool to said central clamping screw.

15. A device according to claim 14, wherein means are provided for fixing the grinding wheel receiving means against rotation.

16. A device according to claim 1, wherein a longitudinal slit is formed in each housing extending along a front surface of the respective housing.

* * * * *